United States Patent [19]  
Flanagan et al.

[11] 3,952,293  
[45] Apr. 20, 1976

[54] METHOD AND APPARATUS FOR DISPLAYING INDUSTRIAL PROCESS CONTROL PARAMETERS

[75] Inventors: Allan L. Flanagan, Attleboro; Richard Driscoll, Mansfield; David A. Richardson, Sheldonville, all of Mass.

[73] Assignee: The Foxboro Company, Foxboro, Mass.

[22] Filed: June 24, 1974

[21] Appl. No.: 482,041

[52] U.S. Cl. .................. 340/213 Q; 116/136.5; 200/56 R; 324/157; 340/266
[51] Int. Cl.² .................................. G08B 29/00
[58] Field of Search ....... 340/317, 316, 266, 27 AT, 340/27 SS, 27 NA, 213 Q; 116/136.5, 129 A, 129 F; 324/78 Z, 78 N, 154 PB, 154 R, 98, 114, 157; 200/56; 317/108

[56] References Cited
UNITED STATES PATENTS

| | | | |
|---|---|---|---|
| 2,464,191 | 3/1949 | Wen | 177/311 |
| 2,780,686 | 2/1957 | Elliott | 200/56 |
| 3,588,516 | 6/1971 | Friedman | 250/231 |

*Primary Examiner*—John W. Caldwell  
*Assistant Examiner*—James J. Groody  
*Attorney, Agent, or Firm*—Frank J. Fleming

[57] ABSTRACT

A deviation meter, responding to a deviation signal, is mounted on a turntable which rotates in response to a set point adjustment. Rotation of the turntable maintains the null position of the deviation meter pointer at a scale position corresponding to a set point value, so that a direct readout of the actual measurement value is provided.

10 Claims, 4 Drawing Figures

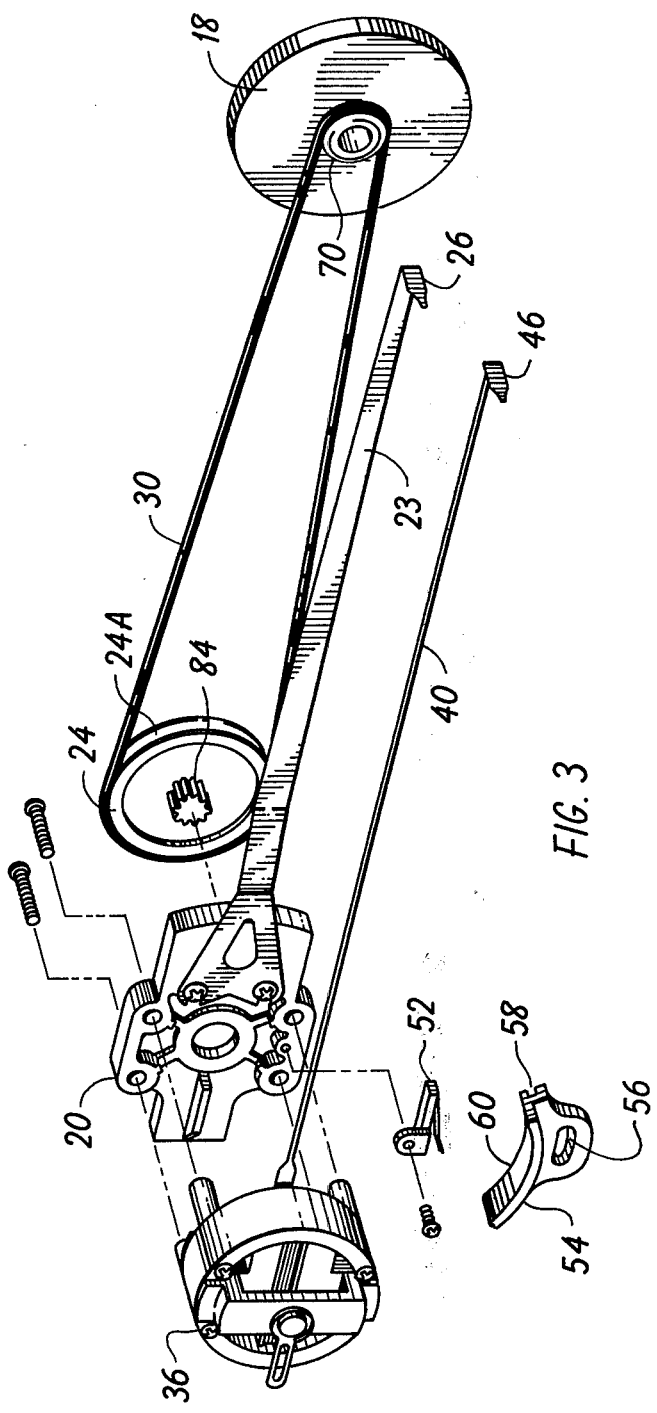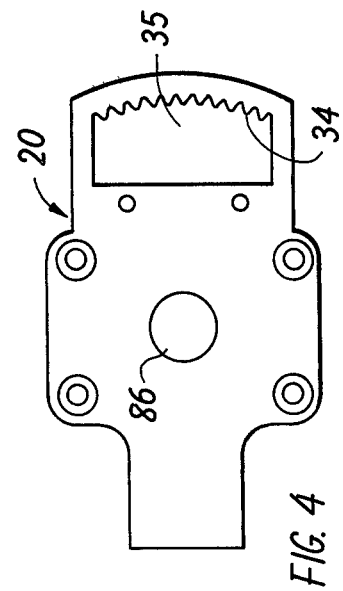

METHOD AND APPARATUS FOR DISPLAYING INDUSTRIAL PROCESS CONTROL PARAMETERS

BACKGROUND OF THE INVENTION

1. Field of the Invention

This invention relates to industrial process control systems. Such systems comprise final operators such as valves, control devices such as electronic controllers, and process monitors such as temperature probes. Such systems are used to adjust the value of a first parameter, such as flow rate into a boiler, in response to the value of a second parameter such as temperature within the boiler.

The final operator varies the value of the first parameter in response to a control signal which is generated by the control device in response to a measurement signal generated by the process monitor. The control signal value is related to the difference between the measurement signal and a set point signal, which represents the actual and desired operating points of the process respectively.

The value of the set point is selected by either a process engineer or computer to optimize the process, and is based upon calculations not relevant to the disclosure. It is necessary to display the set point and measurement values for use by the process engineer as an indication of the degree to which the actual operating point of the process conforms to the desired. In the case of a computer generated set point, the availability of this information allows the engineer to take over control of the process in case of computer failure.

This invention describes devices used to display these values. The quantity displayed may be the actual parameter value, the value of the control system signal representing the parameter, or a dimensionless quantity related to the signal or parameter ranges known as "percent span".

In this discussion the term "percent span" or simply "percent" will be used for the sake of clarity. The actual range of value the signal is allowed to assume is merely a characteristic of the particular control system chosen and may, for example be 0–10 volts, 4–20 milliamps, or 3–15 psi. The parameter range represented by a signal range is a characteristic of the particular process and dependant on not only the actual parameter, such as flow rate or temperature, but on the expected parameter variation. Thus, one process may require a parameter range of temperature of 25–50°F or -20 – 100°F.

To avoid the confusion resulting from many combinations of signal and parameter ranges possible, it is conventionally acceptable to represent and discuss these values in terms of their span. Span is the algebraic difference between the minimum and maximum value of the parameter or signal. For example, a temperature range of –20 to 100°F has a span of 120°, while a signal range of 0 to 10 volts has a span of 10 volts. For a control system in which a 0–10v range represents –20 to 100°F, 25% span corresponds to 10°F, if referring to parameter value, and to 2.5v if referred to signal value. For the purpose of this discussion, both values would be referred to as a parameter value of 25% span or a signal value of 25% span. The indicators referred to thereby display a range of 0–100% span, although it is understood that it is obvious to display only a portion of the span.

This invention relates to electronic display devices used to indicate measurement and set point values. Indicators for set point and measurement displays are generally of two types. The first type presents a digital readout in response to a signal imposed on logic circuitry, and includes CRT's, light emitting diodes, and Nixie $^{(TM)}$ tubes.

The second type of display utilizes a meter type indicator which provides a voltmeter or ammeter for positioning a pointer on a scale in response to the voltage or current value of a monitored signal. The actual signal monitored is dependant upon the type of meter used and represents the parameter to be controlled.

One type of meter used to indicate set point or measurement value is an absolute value meter, which monitors the set point or measurement signal and positions the pointer in response to the signal magnitude. The scale range is, of course, 0 to 100% span, with the 0% and 100% points at the opposite endpoints of the scale. Although absolute meters are inherently accurate at the 0% span point, and may be calibrated for accuracy at a second point, the accuracy at all other points is limited by errors resulting from the non-linearity which is characteristic of such meters. These problems are costly to overcome, and generally limit the usefullness of absolute meters where accurate displays are required. For example, an absolute meter having a typical accuracy of ±5% may indicate 25% span in response to an actual measurement value of 20–30% span.

To overcome the problem, deviation meters were used to indicate the algebraic difference between the set point and the measurement values, hereinafter called the deviation value. Deviation meters monitor the deviation signal and position a pointer in response to both the magnitude and polarity of the deviation value. The scale range is minus 10% span to plus 10% span with a centrally located 0% span point. If, for example, the set point value is 50% span and the measurement value is 60% span, the deviation meter will indicate +10% span on its scale. A change in the measurement signal to 40% span will result in an indication of –10% span on the scale.

Errors due to non-linearity are greatly minimized by use of a deviation meter coupled with a particular characteristic associated with process control systems. Under normal conditions, the set point and the measurement values of a control system will be approximately equal, and the deviation signal will normally be just a few percent of span. Thus, a deviation meter providing an indication of ±10% span and having the typical accuracy of ±5%, would display a deviation value accurate to ±0.5% span. If the set-point value is known, the measurement value may be ascertained by simply adding the indicated deviation value to the value of the set-point.

This invention specifically relates to display devices using deviation meters to indicate measurement and set-point values.

2. Description of the Prior Art

The use of deviation meters in set-point and measurement displays is known in the art. Typically, the deviation meter positions a pointer on a deviation scale to indicate the polarity and magnitude of the monitored deviation signal. The measurement value may then be determined by adding the deviation value to the set-point value. That addition may be performed mentally, or the display configuration may correlate the deviation scale to a set point scale in a manner which allows the measurement value to be determined by reference to the two scales.

One such configuration known in the art has a front panel containing a linear deviation scale and a proximately located set-point adjustment knob. The linear scale has a centrally located null point of 0%, and two end points of +10% span and −10% span. Associated with the linear scale is a fixed pointer, located at the null point, and a movable pointer which is positioned by a deviation meter and moved from the null point towards one of the endpoints in response to the magnitude and polarity of a deviation signal.

The set point adjustment knob may be rotated to adjust the set-point value, which is determined using the fixed pointer as a reference for a circular set point scale located on the dial surface.

In operation, the deviation and set point values may be determined from the linear and circular scales, respectively, and added together to obtain measurement values. The mental addition may be eliminated in a manner to be explained below, utilizing a series of parallel lines, etched in the front panel, which correlate points on the linear scale to points on the periphery of the circular scale. In operation, the set point dial is rotated until the desired set point value on the dial scale, appears under the etched line leading to the fixed pointer. The deviation scale positions the movable pointer in response to the magnitude and polarity of the deviation signal, to indicate the deviation value which may then be converted to the actual measurement value by following the particular etched line from linear scale position to the periphery of the dial. The dial scale value at the end of the line is the actual measurement value.

Besides being rather cumbersome, the above configuration has a limitation in that the lines extending from the linear scale may only correlate that portion of the dial scale within +90° of the set point value. Further, the increments between dial scale units, as transposed to the linear scale, become smaller as distance from the null position increases, resulting in difficult interpolation. In practice, only measurement values within ±30% span of set point could be read in conjunction with three inch linear scale.

A second configuration known in the art partially overcomes the difficulties in readability associated with the previously described configuration by using a deviation meter to display the actual measurement value. This second configuration uses a tape having a set point scale printed thereon and movable between two reels in a manner similar to film in a movie projecter or tape in a tape recorder.

A portion of the tape may be viewed through a window located between the two reels, the window including a fixed indicating pointer. Adjustment of the set point value rotates the reels, causing the proper set point value to appear under the indicating pointer, and exposing the surrounding portion of the tape from which measurement signals may be read. A movable pointer, having a null position co-incident with the position of the fixed pointer, is moved from its null position in response to the magnitude and polarity of a deviation signal. The movable pointer is positioned on the exposed portion of the tape at the scale point corresponding to the measurement value, said point being a distance from the set point scale point which is proportional to the deviation signal. This configuration provides an effectively large scale within a relatively small area, but suffers from several disadvantages. As the effective length of the scale increases, the portion of the tape exposed through the window represents a less permissable variation of the measurement signal around the set point value. Further, the configuration necessitates a complex construction.

SUMMARY OF THE INVENTION

It is the object of this invention to provide a device for indication of process measurement and set point values with high accuracy, at a low cost by the use of simplified construction.

This and other objects of the present invention are accomplished by the design described below in which a deviation meter and means for adjusting the magnitude of the set-point signal are simultaneously positioned manually with the setting of the set-point pointer to the desired value on a scale. The null point of the deviation meter corresponds at all times to the value represented by the position of the set-point pointer on the scale. The distance the pointer of the deviation meter deflects from the set-point pointer corresponds to the magnitude of the deviation signal and the direction of deflection is dependent on the polarity of the deflection signal. The position of the pointer of the deflection meter on the scale corresponds to the value of the measured process variable because the value of the set-point signal combined with the value of the measured process condition is of the same magnitude as represented by the position of the set-point pointer on the scale.--

BRIEF DESCRIPTION OF THE DRAWINGS

FIG. 1 is a front view of the preferred embodiment of the invention.

FIG. 3 is an explosion view showing the interrelationship of several components of the invention.

FIG. 4 is an elevation view of a turntable according to the invention.

DETAILED DESCRIPTION OF THE PREFERRED EMBODIMENT

Figure 2:
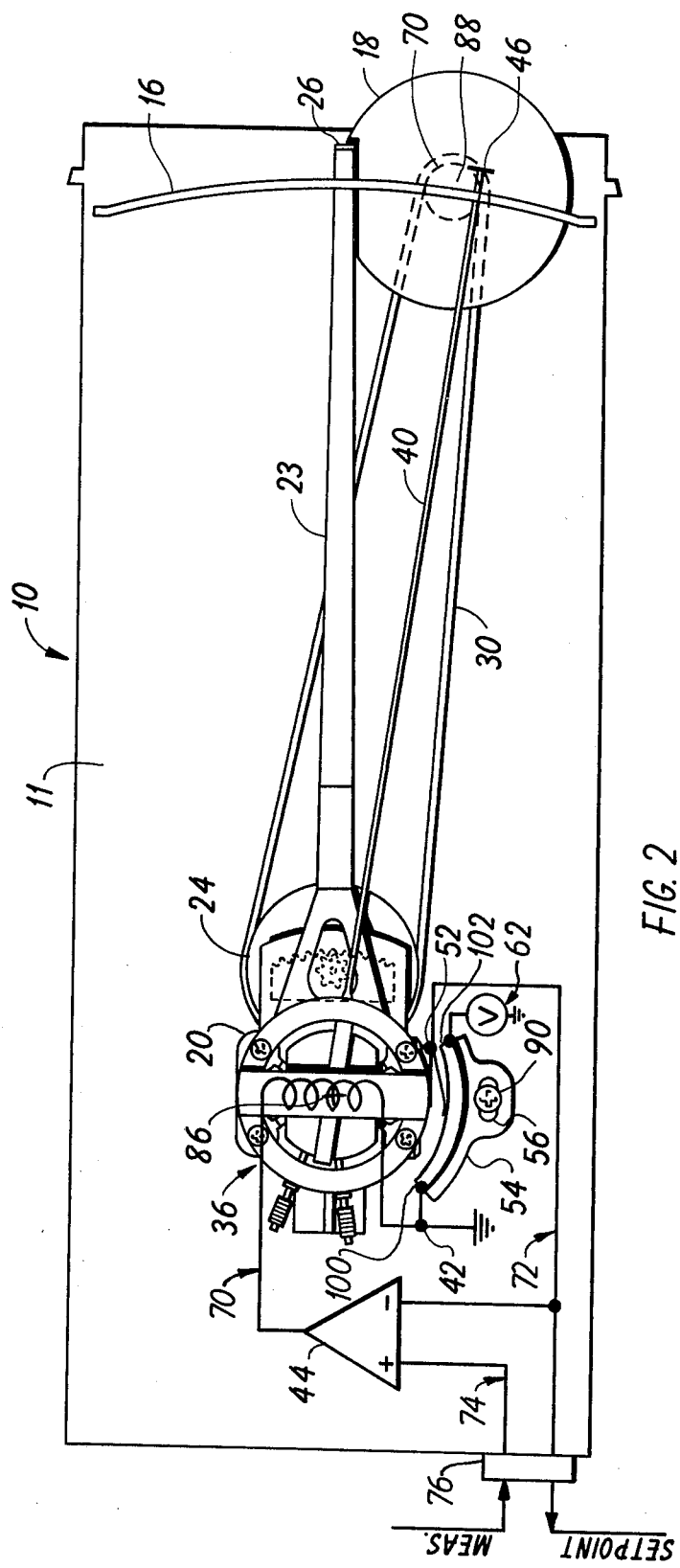
FIG. 2 is a simplified side view of the preferred embodiment of the invention.

An indicator assembly providing the display of one measurement signal parameter according to the invention is described below.

FIG. 1 is a front view of an indicator assembly 10 having a front panel 12. The front panel 12 has a first rectangular slot forming a window through which a scale 16 is visible, and a second smaller slot through which a thumbwheel 18 protrudes. The scale 16 has incremental markings horizontally inscribed across it's face representing the scale range of 0–100% span. A set point pointer 26 and a measurement pointer 46 indicate set point and measurement values on scale 16. As will be explained below with reference to the remaining figures, the pointer 26 moves in response to the manual rotation of the thumbwheel 18 and the pointer 46 moves in response to both a deviation signal and the rotation of the thumbwheel 18.

FIG. 2 is a side view of the indicator assembly 10 showing the internal components thereof relevant to the disclosure of the invention. The scale 16, the pointers 26 and 46, and the thumbwheel 18, described hereinabove with reference to FIG. 1, are located in the front portion of the assembly 10 at the right side of the figure. The pointer 26 is affixed to an arm 23 which extends towards the rear of the assembly 10 and is attached at its other end to a turntable 20.

The turntable 20 is mounted on a chassis 11 for rotation about axis 86 on a chassis 11, thereby moving pointer 26 along scale 16 to indicate the set point value.

The rotation of the turntable 20, and the consequential positioning of the pointer 26 on the scale 16, is caused by the rotation of the thumbwheel 18 which functions as the manual set point adjustment. The thumbwheel 18 is coupled to turntable 20 by belt 30 and a reduction wheel 24 which is mounted for rotation on the chassis 11. The belt 30 couples the thumbwheel 18 to the reduction wheel 24 by forming a loop which encloses a protruding hub 70 of thumbwheel 18, on one end, and the reduction wheel 24 at the other end. The belt 30 may simply be a rubber O-ring or a dial chord similar to those found in the tuning mechanisms of some radios. When a dial chord is used, strain relief may be provided by the connection of a small spring between two ends thereof. Besides providing an interface surface between the thumbwheel 18 and the belt 30, protruding hub 70 provides such a surface between the thumbwheel 18 and the chassis 11. By substantially reducing the contact area between the thumbwheel 18 and the chassis 11, the frictional rotation between the two components is substantially reduced, thereby providing easier manual thumbwheel rotation. The reduction wheel 24 interfaces with turntable 20 through a gearing arrangement which may be better understood by reference to FIG. 3.

FIG. 3 is an explosion view of the components according to the invention. It should be noted that the thumbwheel 18 has been "flipped" to provide a clearer view of the hub 70 and its enclosure by the belt 30.

As described above, coupling between reduction wheel 24 and turntable 20 is accomplished by a gear arrangement comprising of a spur gear 84 affixed to the top of the reduction wheel 24 for rotation therewith, and an internal spur gear formed in the surface of the turntable 20. The internal spur gear may be viewed by reference to FIG. 4.

FIG. 4 is an elevation view of the turntable 20 showing the internal spur gear formed therein. A cavity 35 is formed in the surface of the turntable 20 and is defined along its outer boundary internal spur gear 34 which comprises a generally curved wall located a constant radial distance from the center of rotation 86 of the turntable 20, and having a series of teeth formed therein. The configuration allows the manufacture of the turntable 20 and internal spur gear 34 to be performed by a single inexpensive molding process.

Returning to FIG. 3, the coupling of reduction wheel 24 to turntable 20 may now be clearly seen. Spur gear 84 affixed to the surface of reduction wheel 24 for rotation therewith, is placed within cavity 35 of turntable 20 (FIG. 4) and is coupled to internal spur gear 34 (FIG. 4). Because the internal spur gear 34 has been formed along a wall of constant radial length from center of rotation 86, internal spur gear 34 and spur gear 84 continue to mate as turntable 20 rotates.

The pointer 46, briefly described above with reference to FIG. 1, is shown attached to an arm 40 which is supported by a deviation meter assembly 36. The deviation meter assembly 36 is mounted on the turntable 20 for rotation therewith and is positioned thereon to provide a null position of pointer 46 which is essentially coincident with the position of pointer 26. In practice, arm 40 is slightly shorter than arm 23 so that pointer 46, when in its null position, is directly behind pointer 26. When the thumbwheel 18 is manually rotated to rotate the turntable 20 and position the pointer 26, the deviation meter assembly 36 rotates therewith, maintaining the essential coincidence of the pointer 26 with the null position of pointer 46.

The deviation meter assembly 36 moves arm 40 from a centrally located null position towards one of two end positions in response to the magnitude and polarity of a deviation signal applied thereto. The deviation signal is proportional to the difference between the process measurement signal and set point signal values.

The need to position the pointer 26 to indicate the set point value, makes it convenient and desirable to generate the set point signal within the display unit. Because the set point signal value is proportional to the scale position of pointer 26 and, therefore, to the position of the turntable 20, the set point signal may be generated as a function of the position of the turntable 20, and summed with the process measurement signal to obtain the deviation signal required by meter assembly 36.

One method known in the art for converting a mechanical position to an electrical signal employs a slidewire. A slidewire is essentially an electrically resistive wire which is divided into two parts by a sliding contact. When a voltage is impressed between the ends of the wire, the voltage between the contact and the reference end of the wire is proportional to the distance between the contact and the reference end. If the wire resistance is essentially linear, the voltage at the contact may be determined by the equation:

$$E_c = E_{max} \frac{l}{L} \text{ where } E_c = \text{contact voltage}$$

$E_{max}$ = impressed voltage
$l$ = distance between contact and reference end
$L$ = length of wire In the preferred embodiment, the position of the turntable 20 is converted into an electrical set point signal by a slidewire arrangement comprising a fixture 54 and an electrically conductive wiper 52, shown in FIG. 3. The face of the fixture 54 is shaped to define a generally circular arc, and has an electrically resistive material 60 deposited thereon. The resistive material may be a conductive plastic such as that made by Waters Manufacturing, Incorporated; Wayland, Mass. Concentric with the face is a channel 58 formed in, and extending along, the base of the fixture 54. The purpose for the channel 58, and the employment of the wiper 52 and the fixture 54 to generate a set point signal, are more clearly shown with reference to FIG. 2.

Turning to FIG. 2, the fixture 54 is shown affixed to the chassis 11 proximate to the turntable 20. The wiper 52 is attached to the turntable 20 for rotation therewith and extends parallel to, and slightly beyond, the surface thereof to contact the deposited resistive material 60 on the face of the fixture 54. To maintain contact between the tip of the wiper 52 and the resistive material 60 as the turntable 20 rotates, the arc formed by the face of the fixture 52 is concentric with the path travelled by the wiper tip.

Power for the generation of a set point signal is furnished by a voltage source 62 connected to connection point 102 on material 60. A second connection point 100 is connected to electrical common, thereby establishing a voltage across the resistive material 60. The value of the set point signal 72 sensed by the wiper 52 at its contact point with the material 60 is related to the location of the wiper contact and to the magnitude of the impressed voltage as determined by the slidewire equation given above. The magnitude of the voltage source 62 is chosen to provide a voltage corresponding to 100% span on wiper 52 as its contact point with the material 60 when the turntable 20 is positioned to indicate that value on scale 16 with pointer 26.

Because the set point value is represented both mechanically by the position of the turntable 20, and electrically by the voltage on the wiper 52, it may be necessary to provide a means for aligning the electrical and mechanical spans so that the mechanical and electrical representations are accurately equated. One method is to position the turntable 20 to indicate a selected set point value on scale 16 with pointer 26, and to adjust the position of the fixture 56 with respect to the wiper 52 until the set point signal representing the selected value is sensed by the wiper 52. The adjustment may be performed easily if means are provided for moving the fixture 54 about the turntable 20 while maintaining the spacing therebetween necessary to insure contact between the wiper 52 and resistive material 60. In the preferred embodiment, a track 64 is formed in the chassis 11 to guide the fixture 54 concentrically about the path taken by the tip of the wiper 52. Placement of fixture 54 on the chassis 11 is accomplished by mounting the channel 58 (FIG. 3), formed along the base of the fixture 54, on the track 64.

In operation, the turntable 20 is positioned so that the pointer 26 indicates a particular set point value on the scale 16; the fixture 54 is moved along the track 64 until the proper set point signal value is obtained at the wiper 52. The fixture 54 is secured to the chassis 11 by a screw 90 inserted through an elongated slot 56 which formed through the fixture 64.

The deviation signal 70 which is applied to meter assembly 36 is generated by a summing amplifier 44 which algebraically sums the set point signal 72 and the process measurement signal 74 applied to its input terminals. The process measurement signal 74 is generated by a process monitor and brought into the display unit 10 through a connector 76 which also provides a means for transmitting the generated set point signal to other instruments in the process control system.

Deviation meter assembly 36, which has been positioned on turntable 20 to maintain a null scale position of pointer 46 coincident with the scale position of pointer 26, moves the pointer 46 in response to the polarity and the magnitude of the deviation signal 70 applied thereto. If the polarity of the deviation signal is positive, indicating that the process measurement signal value is greater than the set point signal value, pointer 46 is moved from its null position towards the 100% scale position through a distance proportional to the deviation signal magnitude. Similarly, if the polarity of the deviation signal 70 is negative, indicating that the process measurement signal is less than the set point value, the pointer 46 is moved from its null position towards the 0% scale position. The result is that the actual process measurement signal value is displayed, although the indicated quantity is the deviation signal value. The following two examples illustrate the effect:

| PROCESS CONDITIONS | | | DISPLAYED VALUES | |
|---|---|---|---|---|
| Process Measurement Value | Set Point Value | Deviation Value | Set Point | Process Measurement |
| 30% | 50% | −20% | 50% | 30% |
| 70% | 50% | +20% | 50% | 70% |

We claim:
1. A display apparatus for a process instrumentation system for indicating a set-point value and measured value of a process condition, comprising, in combination a scale having graduated indicia representative of said set-point and measured values;

a set-point indicating device arranged to present a set-point pointer adjacent said scale to indicate said set-point value;

said set-point indicating device including an element for manually adjusting said set-point pointer to any position along said scale;

means coupled to said set-point indicating device for adjusting the value of a set-point signal as a function of the position of said set-point pointer along said scale;

means for developing a deviation signal representing the difference between said set-point signal and a measurement signal representative of said measured value of the process condition;

a deviation indicating device arranged to present a measurement pointer adjacent said scale;

said deviation indicating device having means responsive to said deviation signal for positioning said measurement pointer, said deviation indicating device being dependently coupled to said set-point indicating device for movement therewith whereby said measurement pointer is positioned by said responsive means a distance away from said set-point pointer corresponding to the magnitude of said deviation signal and adjacent said scale to indicate said measured value of process condition.

2. The display apparatus of Claim 1 wherein said set-point indicating device includes a turntable positionable by said element to supportably position said set-point pointer.

3. The display apparatus of Claim 2 wherein said deviation indicating device is coupled to said turntable for rotation therewith for maintaining said measurement pointer at a null position corresponding to the scale position of said set-point pointer whereby said means responsive to said deviation signal moves said measurement pointer along said scale from said null position in response to the magnitude and polarity of said deviation signal.

4. The display apparatus of Claim 3 wherein said element of said set-point indicating device comprises:
an internal gear formed in said turntable;
a second gear mating with said internal gear;
a manually rotatable thumbwheel; and
means coupling said thumbwheel to said second gear, whereby movement of said thumbwheel is transmitted through said coupling means, second gear and internal gear to position said turntable.

5. An improved display for process control instrumentation for displaying set point and process measurement parameter values of the type having a fixed scale having incremental markings representing the setpoint and measurement value ranges;

a set-point indicator arm movable with respect to said scale to indicate said set-point value by its position relative to said scale;

means for positioning said set-point arm;

a measurement indicator arm movable with respect to said scale for indicating the process measurement value;

a deviation meter for moving said measurement indicator arm from a null position in response to a deviation signal related to the difference between said process measurement value and said set-point value; and means for producing the deviation signal;

Wherein the improvement comprises:

means responsive to said positioning means for maintaining the null position of said measurement arm at the scale position corresponding to the set-point value, said meter moving said measurement arm from its null position in response to said deviation signal so that the absolute process measurement value is indicated in conjunction with said scale.

6. The display of claim 5 including means for generating a set-point signal.

7. The display of claim 6 wherein said set-point generating means comprises;

a fixture having a deposited electrically resistive material thereon, and a wiper, positionable along said material by said arm positioning means for sensing a position-related signal thereon.

8. The display of Claim 7 wherein said material is an electrically conductive plastic.

9. The display of claim 7 wherein;

said wiper is attached to said turntable for rotation therewith.

10. A method for displaying set-point and measurement values for use with process control instrumentation systems comprising the steps of;

manually positioning a first indicator arm to indicate the setpoint value in conjunction with a fixed scale, generating a signal corresponding to the set-point value, positioning a second indicator arm with respect to said scale in response to the difference between said generated signal and a process measurement signal, and moving said second indicator arm in response to the movement of said first indicator arm to maintain the null position of said second indicator arm coincident with the scale position of said first indicator arm, whereby the position of said second indicator arm indicates the absolute value of the process measurement signal in conjunction with said scale.

* * * * *